(12) United States Patent
Owczarek

(10) Patent No.: US 10,779,563 B2
(45) Date of Patent: Sep. 22, 2020

(54) METHOD OF EMPTYING A CONTAINER FILLED WITH ROD-LIKE ARTICLES MANUFACTURED IN THE TOBACCO INDUSTRY

(71) Applicant: International Tobacco Machinery Poland Sp. z o. o., Radom (PL)

(72) Inventor: Radoslaw Owczarek, Radom (PL)

(73) Assignee: International Tobacco Machinery Poland Sp. z o. o., Radom (PL)

( * ) Notice: Subject to any disclaimer, the term of this patent is extended or adjusted under 35 U.S.C. 154(b) by 0 days.

(21) Appl. No.: 15/926,855

(22) Filed: Mar. 20, 2018

(65) Prior Publication Data
US 2018/0295873 A1 Oct. 18, 2018

(30) Foreign Application Priority Data

Apr. 18, 2017 (EP) .................................... 17166762

(51) Int. Cl.
| | | |
|---|---|---|
| *A24C 5/356* | (2006.01) | |
| *A24C 5/32* | (2006.01) | |
| *B65G 65/44* | (2006.01) | |

(52) U.S. Cl.
CPC .............. *A24C 5/356* (2013.01); *A24C 5/325* (2013.01); *B65G 65/44* (2013.01); *B65G 2201/0226* (2013.01)

(58) Field of Classification Search
CPC ............ B65B 69/00; B65B 19/30; A24C 5/34
USPC ........................................................ 209/535
See application file for complete search history.

(56) References Cited

FOREIGN PATENT DOCUMENTS

| | | |
|---|---|---|
| DE | 1066118 B | 9/1959 |
| DE | 3918236 A1 | 12/1990 |
| DE | 102015009740 | 2/2017 |
| EP | 1741351 | 1/2007 |
| GB | 1520911 * | 8/1974 |
| WO | 2008020775 | 2/2008 |
| WO | 2017021189 | 9/2017 |

OTHER PUBLICATIONS

European Search Report for EP 17 16 6762, completed Oct. 2, 2017.
Polish Search Report in application P.421322, dated Jun. 26, 2018.

* cited by examiner

*Primary Examiner* — Saul Rodriguez
*Assistant Examiner* — Willie Berry, Jr.
(74) *Attorney, Agent, or Firm* — Oppedahl Patent Law Firm LLC

(57) ABSTRACT

Method of emptying a container filled with rod-like articles manufactured in the tobacco industry comprising the following stages: the container to be emptied is delivered to the entrance area of an intermediate store comprising adjacent channels separated from one another by walls; the rod-like articles are transferred by supporting plates from the container to the channels of the intermediate store; the channels of the intermediate store are filled with the rod-like articles; characterised in that during the transfer of the rod-like articles from the container to the channels of the intermediate store the intermediate store makes a reciprocating motion in the horizontal direction, transversely to the axis of the rod-like articles.

9 Claims, 4 Drawing Sheets

METHOD OF EMPTYING A CONTAINER FILLED WITH ROD-LIKE ARTICLES MANUFACTURED IN THE TOBACCO INDUSTRY

The object of the invention is a method of emptying a container filled with rod-like articles manufactured in the tobacco industry.

Tobacco industry's factories manufacture various articles for smoking. Both finished and semi-finished products made at successive production stages may be jointly referred to as rod-like articles which may be transported on conveyors or in containers. Plastic or cardboard containers which are used for all types of rod-like articles, among others for cigarettes, cigarillos, cigars and filter material rods, are commonly used in the tobacco industry. Plastic containers have the shape of a cuboid without two adjacent walls, i.e. these are containers having four walls or cardboard containers having five walls. The containers are used for temporary storage and transport of rod-like articles to a target place where they are subsequently emptied in order to deliver the rod-like articles in the form of a mass flow to machines on which the process operations related to the manufacturing of articles for smoking are carried out.

The description of the European patent no. EP1020126 discloses a method and an apparatus for the transport of cigarettes wherein the cigarettes are transferred by means of trays from a manufacturing machine to an intermediate store where they are unloaded, and then transported by a receiving conveyor to a hopper of a packing machine. The intermediate store is divided by separating elements into multiple vertical adjacent channels, and a supporting element moving together with the cigarettes from top to bottom of the store is assigned to each channel, whereas the separating elements have the shape of a drop and a comb-like structure where the slots of the supporting elements having the shape of a flat comb, fit into the protruding ribs of the structure. The vertical sidewall of the intermediate store on the side of the packing machine is movable and moves together with a conveyor removing the cigarettes towards the hopper of the packing machine. The length of the separating elements is smaller than the height of the intermediate store, whereas the element situated closest to the movable sidewall is the shortest one, and the length of successive elements gradually increases, whereas the end of the longest element is situated at a considerable distance from the receiving conveyor. So the cigarettes are conveyed to the hopper in a layer corresponding to the height of the movable sidewall of the intermediate store, and the height of the layer is maintained by the moving sidewall until the hopper is reached.

The document U.S. Pat. No. 4,489,534 discloses an apparatus for filling of trays with cigarettes from a store. The trays are continually or gradually lowered while the channels of the store guide the streams or columns of cigarettes downwards to the trays, forming cigarette layers in the trays. The adequate packing of the cigarettes is ensured by shafts or guides situated in the bottom part of the store channels.

The European patent EP 2,676,884 registered by Sasib discloses an apparatus for feeding of rod-like articles from a hopper to a packing machine through vertical channels formed by walls situated next to one another. Since the vertical channels have a width being in principle equal to the diameter of the rod-like article and the inflow of articles in the form of a mass flow may block the entrance to the channels, the inventor placed, above each of the vertical walls before the entrance to the channel, a roller or a shaft which oscillate in two directions around their axis which is parallel to longitudinal axis of the rod-like articles. The oscillation of the shafts causes a smooth passage of the rod-like articles from the hopper to the store channels.

All known methods and apparatuses for unloading of containers are characterised by a common principle such that the emptying containers of rod-like articles transferred to an intermediate store, to a hopper or onto a conveyor is effected by gravity due to the removal of one common element supporting the rod-like articles from the bottom or individual supporting elements in particular segments or segment groups. It involves the risk of disturbance of uniform flow of the rod-like articles being transferred, the jamming or deformation thereof by the pressure exerted from above by the layers of successive inflowing rod-like articles, and the pressing against the elements arranging or dividing the mass flow such as dividers.

The object of the invention is a method of emptying a container filled with rod-like articles manufactured in the tobacco industry comprising the following steps: the container to be emptied is delivered to the entrance area of an intermediate store comprising adjacent channels separated from one another by walls; by means of supporting plates rod-like articles are transferred from the container to the channels of the intermediate store; the channels of the intermediate store are filled with the rod-like articles. The method is characterised in that during the transfer of the rod-like articles from the container to the channels of the intermediate store the intermediate store makes a reciprocating motion in the horizontal direction, transversely to the axis of the rod-like articles.

The method according to the invention is further characterised in that during the transfer of the rod-like articles from the container to the channels of the intermediate store the supporting plates make a reciprocating motion in the horizontal direction, transversely to the axis of the rod-like articles.

The method according to the invention is further characterised in that the supporting plates make a reciprocating motion synchronised with the reciprocating motion of the intermediate store.

The method according to the invention is further characterised in that during the transfer of the rod-like articles from the container to the channels of the intermediate store the intermediate store makes a reciprocating motion with a stroke principally equal to the size of the diameter of rod-like articles.

The method according to the invention is further characterised in that during the transfer of the rod-like articles from the container to the channels of the intermediate store the intermediate store makes a reciprocating motion with a stroke between 2 and 40 mm, preferably between 4 and 8 mm.

The method according to the invention is further characterised in that during the transfer of the rod-like articles from the container to the channels of the intermediate store the intermediate store makes principally as many full cycles of the reciprocating motion as the number of layers of the rod-like articles situated in the filled container.

The method according to the invention is further characterised in that during the transfer of the rod-like articles from the container to the channels of the intermediate store the number of full cycles of the reciprocating motion made by the intermediate store is greater than the number of layers of the rod-like articles situated in the filled container.

The method according to the invention is further characterised in that during the transfer of the rod-like articles from the container to the channels of the intermediate store the number of full cycles of the reciprocating motion made by the intermediate store is smaller than the number of layers of the rod-like articles situated in the filled container.

The method according to the invention is further characterised in that during the transfer of the rod-like articles from the container to the channels of the intermediate store a frequency of reciprocating motions is principally proportional to the speed of transfer of the rod-like articles from the container to the channels of the intermediate store.

The method according to the invention is further characterised in that during the transfer of the rod-like articles from the container to the channels of the intermediate store a frequency of the reciprocating motions is constant.

The method according to the invention is further characterised in that during the transfer of the rod-like articles from the container to the channels of the intermediate store a frequency of the reciprocating motions is variable.

An advantage of the method according to the invention is the elimination of jamming and damaging of rod-like articles when emptying the container filled with rod-like articles of the tobacco industry to the intermediate store.

The object of the invention was shown in detail in a preferred embodiment in a drawing in which.

Figure 1:
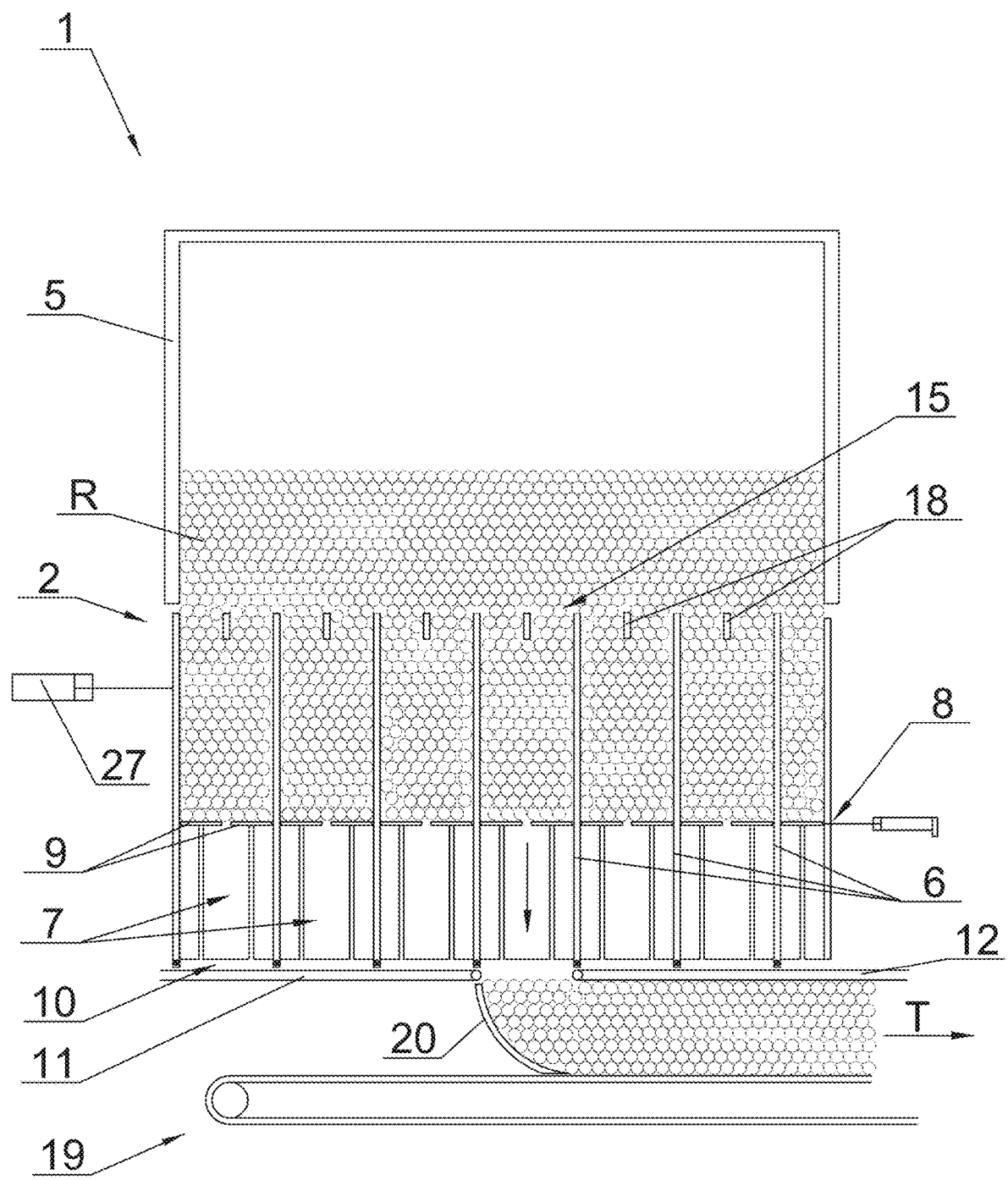
FIG. 1 shows a station for emptying a filled container in the front view during the feeding of the rod-like articles into the channels of the intermediate store.

For better understanding of the invention the object of the invention was illustrated in a drawing in which FIG. 1 shows an embodiment of a station 1 for emptying of a filled container 5 to an intermediate store 2, whereas FIGS. 2 to 6 show the behaviour of selected rod-like articles during the feeding of the rod-like articles into channels of the intermediate store 2.

FIG. 1 shows a station 1 for emptying of containers 5 filled with rod-like articles R. The station 1 has an intermediate store 2, a transferring element 8, a discharging conveyor 19 and a hopper 20. The intermediate store 2 has dividers 6 dividing the space of the intermediate store 2 into a number of vertical channels 7. In the vertical channels 7, in their inlets 15, there are situated additional dividers 18. The transferring element 8 has a number of supporting plates 9 which are adapted to support the mass flow of rod-like articles in the channels 7 of the intermediate store. The supporting plates 9 may be inserted into the channels 7 through the slots at the inlets 15 of the channels 7 and pushed out of the channels 7 through the slots at the outlets 10 of the channels 7. When the supporting plates 9 are pushed out of the channels 7 the mass flow of rod-like articles R in the channels gets into the hopper 20 or is supported by the belts 11, 12.

Beneath the intermediate store 2 there is situated a discharging conveyor 19. Between the intermediate store 2 and the discharging conveyor 19 there is positioned a slidable hopper 20 adapted to slide along the discharging conveyor 19. The slidable hopper 20 is used to transfer the mass flow of rod-like articles R from the channels 7 onto the discharging conveyor 19 which discharges the rod-like articles R received from the channels 7 of the intermediate store 2 in the discharging direction T, whereas the hopper has a separate drive and is adapted to move relative to the discharging conveyor 19. Above the hopper 20 there is situated a passage formed by the belts 11 and 12.

The intermediate store 2 was shown in FIG. 1 at a moment when the channels 7 were being filled with the rod-like articles R coming from the container 5. The container 5 emptying process is based on pouring the rod-like articles R from the container 5 to the intermediate store 2, whereas the rod-like articles R, when the intermediate store 2 is being filled, are supported from below by means of supporting plates 9 which together with the mass flow of the rod-like articles R are lowered until the maximum lowest position in the outlets 10 of the channels 7 is reached. The supporting plates 9 are subsequently withdrawn from the intermediate store 2 through slots in the outlets of the channels 7, and the rod-like articles remain supported by the belt 11.

The rod-like articles R in the container 5 are usually positioned perpendicular to the back wall of the container 5. If individual rod-like articles R are positioned slantwise, i.e. not perpendicular to the back wall, the upper edges 6a of the dividers 6 and the upper edges 18a of the additional dividers 18 force the movement of such articles during the downward flow so that they position themselves parallel to other rod-like articles R in the mass flow in the vertical channels 7.

Figure 2:
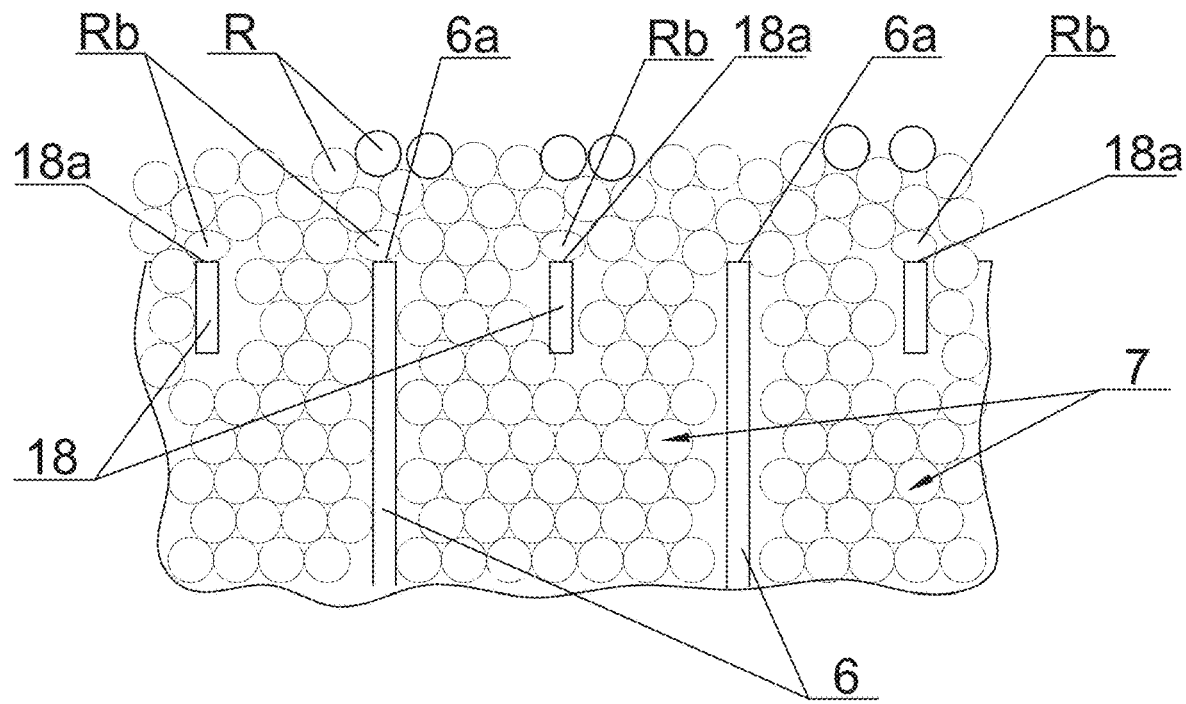
FIG. 2 shows a fragment of the inlet of an intermediate store during the feeding of the rod-like articles into the channels of the intermediate store.

FIG. 2 shows a fragment of the inlet 15 of the intermediate store 2 during the feeding of the rod-like articles R into the channels 7 of the intermediate store 2. There is a risk that during the transfer of the rod-like articles R from the container 5 to the channels 7 some rod-like articles Rb will be pressed against the upper edges 6a of the dividers 6 and against the upper edges 18a of the additional dividers 18 by the rod-like articles R flowing from above. The rod-like articles Rb which have been pressed against the upper edges 6a and 18a are subject to deformation which may be permanent or momentary, depending on the kind of filling material, wrapper material or the speed of filling of the channels 7 with the rod-like articles R. The nature of the deformation has a significant influence on the production process stability and the final product quality.

In order to eliminate the deformation, an additional reciprocating motion S of the intermediate store 2 made during the filling of the same has been introduced. The reciprocating motion S is effected in the horizontal direction, transversely to the axis of the rod-like articles R positioned in the vertical channels 7. The intermediate store 2 is put in the reciprocating motion in the direction S by means of a drive element 27. The supporting plates 9 which support the rod-like articles R fed into the channels 7 of the intermediate store 2 make a reciprocating motion with the same frequency and size of travel together with the intermediate store 2. In addition, the supporting plates 9 together with the transferring element 8, when making the reciprocating motion which is synchronised with the reciprocating motion of the intermediate store 2, perform the operation of filling of the channels 7 with the rod-like articles R through the principally downward movement in the transport direction U. A linear actuator or another mechanism which can put the intermediate store in a reciprocating motion may be used as the drive element 27.

The reciprocating motion S may be described as relatively small oscillations of the intermediate store 2 relative to the resting position made during the filling of the intermediate store 2 with the rod-like articles R. The motion of the intermediate store 2 is a reciprocating motion, however, it may manifest itself in the form of vibrations or other oscillating motions, nonetheless for most rod-like articles of the tobacco industry it is preferable to introduce a smooth motion which will not cause overloads leading to any undesirable degradation of the rod-like articles or spilling of the filling material from the rod-like articles. The travel of the reciprocating motion depends on the type of rod-like articles R. it is recommended that the length of travel of the reciprocating motion is in the range between 2 and 40 mm, preferably is greater than ½ of the diameter of the rod-like article fed into the intermediate store 2, and the frequency of the movement is equal to the number of layers of the rod-like articles being transferred. An embodiment of the invention where the size of travel in the reciprocating motion of the store 2 is a multiplicity of a half of the diameter of the rod-like article R, and the value of frequency is a multiplicity of the number of layers of the rod-like articles being transferred is also preferable.

Figure 3:
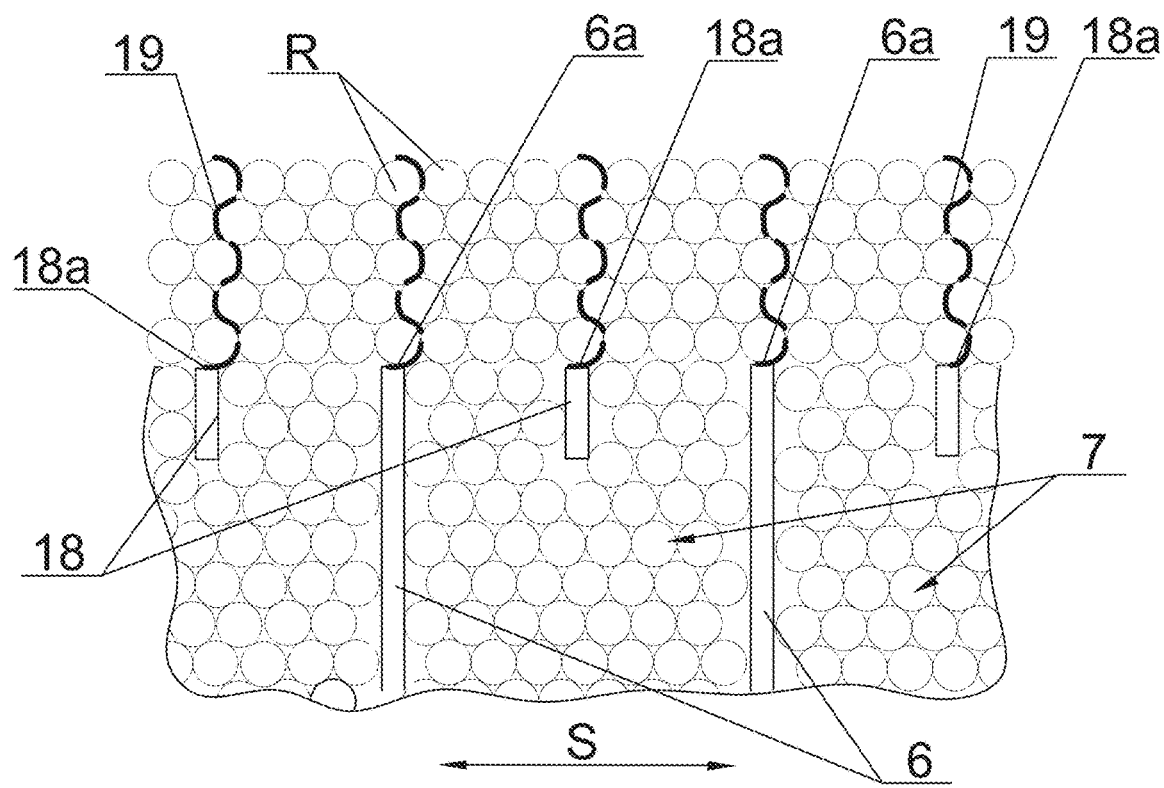
FIG. 3 shows a mode of movement of elements of the inlet of the intermediate store during the feeding of the rod-like articles into the channels of the intermediate store with the reciprocating motion of the intermediate store.

FIG. 3 shows a method of movement of the dividers 6 and the additional dividers 18 of the intermediate store 2 during the feeding of the rod-like articles R into the channels 7 of the intermediate store 2 with the reciprocating motion S of the intermediate store 2. The frequency and the travel of the reciprocating motion S were selected according to the speed of transfer and the size of rod-like articles so that the upper edges 6a and 18a move between the individual rod-like articles R. The upper edges 6a and 18a make a movement in the mass flow of rod-like articles R marked with a path 19. It means that the rod-like articles R situated between the adjacent paths 19 are inserted into the intermediate store 2 between the upper edges 6a and 18a which determine these paths 19. In an ideal situation the upper edges 6a and 18a move in the mass flow solely between the rod-like articles R, which eliminates the risk of deformation of the rod-like article R.

Figure 4:
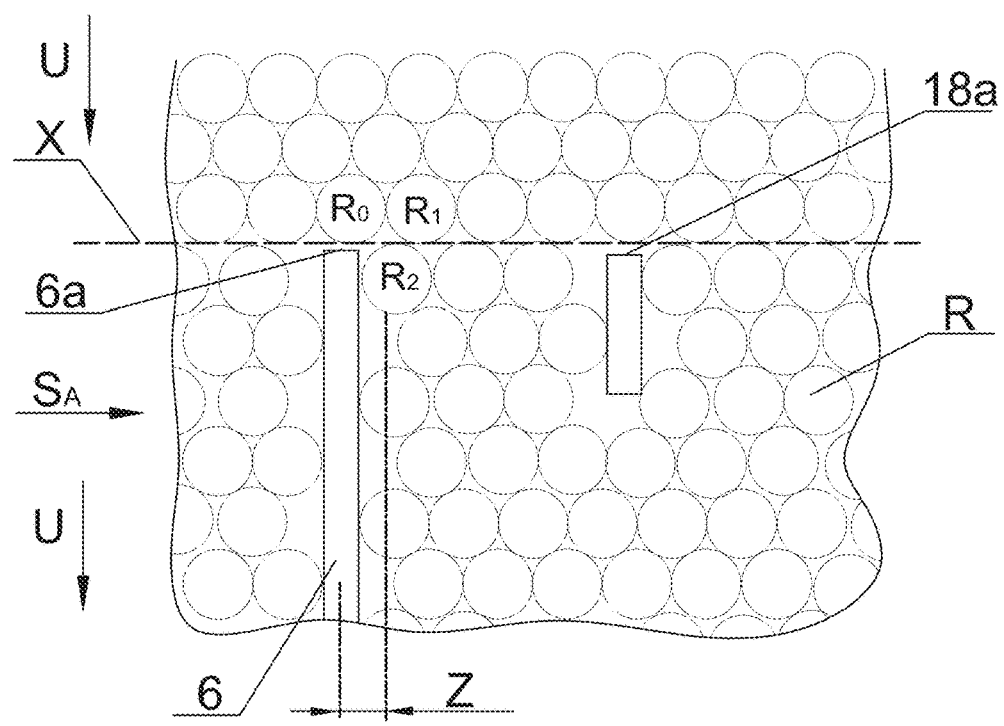
FIG. 4 shows the movement of selected rod-like articles during the feeding of the rod-like articles into the channels of the intermediate store with the oscillating motion of the intermediate store.
Figure 5:
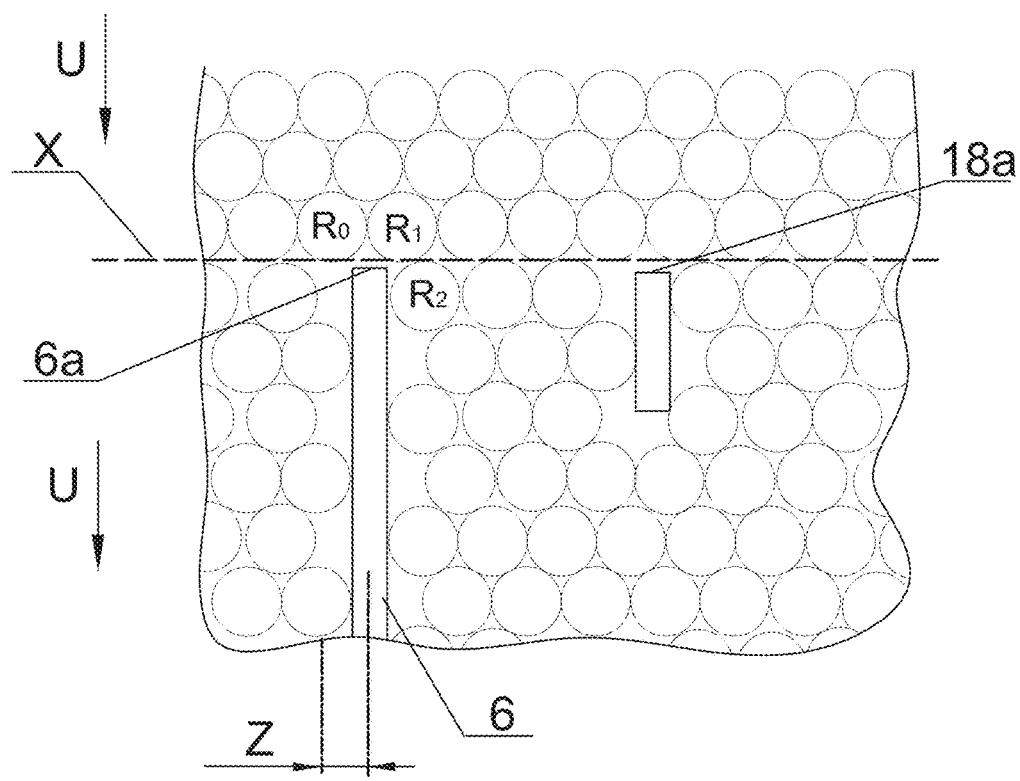
FIG. 5 shows the movement of selected rod-like articles during the feeding of the rod-like articles into the channels of the intermediate store with the oscillating motion of the intermediate store.
Figure 6:
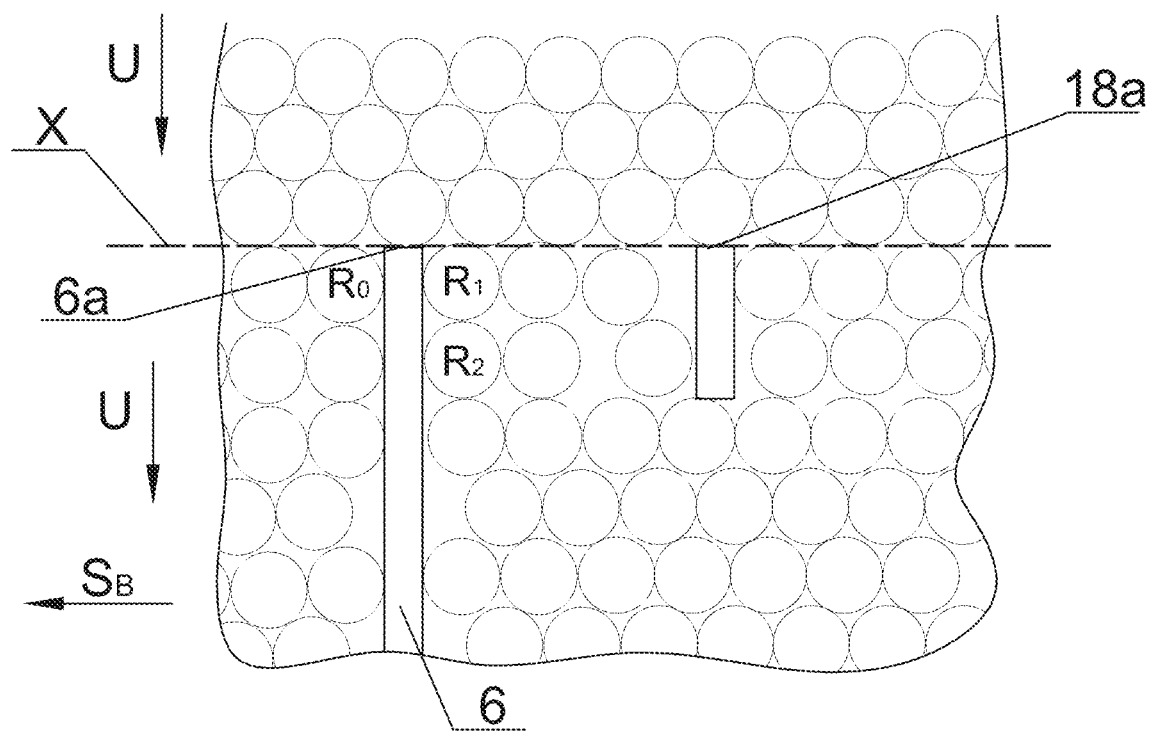
FIG. 6 shows the movement of selected rod-like articles during the feeding of the rod-like articles into the channels of the intermediate store with the oscillating motion of the intermediate store.

In FIGS. 4-6 the movement of selected rod-like articles $R_0$, $R_1$, $R_2$ during the feeding of the rod-like articles R into the channels 7 of the intermediate store 2 with the reciprocating motion S of the intermediate store 2 has been shown. The dotted line X separates the area where the rod-like articles R are still situated outside the intermediate store 2, for example in the container 5 or in the area between the container 5 and the intermediate store 2 above the line X, and the area where the rod-like articles R are situated inside the intermediate store 2 below the line X. The movement of the rod-like articles R situated above the line X is effected in the transport direction U principally downwards and is forced by gravity, whereas the reciprocating motions S of the intermediate store 2 are directly transferred to the rod-like articles R situated below the line X, inside the intermediate store 2 between the dividers 6 and 18. A motion component corresponding to the reciprocating motion S joins the motion component forced by gravity and directed downwards.

In FIG. 4, selected rod-like articles $R_0$, $R_1$, $R_2$ are situated in the area of one of the inlets 15 of the intermediate store 2. The rod-like article $R_0$ is situated just above the edge 6, which could lead to jamming and deformation of the rod-like article $R_0$. In order to prevent it, the intermediate store makes a motion $S_A$ marked in FIG. 4 by an arrow, constituting the first stage of one cycle of the reciprocating motion S. The intermediate store 2 together with the rod-like articles R which are situated inside it, i.e. below the line X, makes a motion to the right relative to the rod-like articles R situated above the line X by a travel Z whose distance is in this case principally equal to ½ of the diameter of the rod-like article R.

FIG. 5 shows a successive step of the reciprocating motion S at which the edge 6a has moved in the horizontal direction, transversely to the longitudinal axis of the rod-like articles by the travel Z relative to the articles situated above the line X, has stopped for a moment and is situated between the articles $R_0$ and $R_1$. The rod-like articles situated below the line X together with the rod-like article $R_2$ have moved with the entire intermediate store 2 by a distance being principally equal to ½ of the diameter of the rod-like article. During the momentary stopping of movement of the intermediate store 2 shown in FIG. 5 the force of gravity acts all the time on the rod-like articles situated both above and below the line X, which causes their downward movement in the transport direction U to the position shown in FIG. 6. The rod-like articles R, $R_0$, $R_1$, $R_2$ move to the intermediate store where a selected rod-like article $R_0$ gets into the intermediate store 2 on one side of the divider 6, and a selected rod-like article $R_1$ gets into the intermediate store 2 on the opposite side of the divider 6. Then the intermediate store makes a motion $S_B$ constituting a successive stage of the cycle of the reciprocating motion S at which the rod-like articles $R_0$, $R_1$ and $R_2$ so situated relative to the divider 6 make a successive common motion with the intermediate store 2.

The invention claimed is:

1. Method of emptying a container filled with cylindrical articles manufactured in the tobacco industry comprising the following steps:
    a container to be emptied is delivered to the entrance area of an intermediate store comprising adjacent channels separated from one another by walls;
    by means of supporting plates cylindrical articles are transferred from the container to the channels of the intermediate store;
    the channels of the intermediate store are filled with the cylindrical articles;
    characterised in that
    during the transfer of the cylindrical articles (R) from the container (5) to the channels (7) of the intermediate store (2) the intermediate store (2) and the supporting plates (9) are put in a reciprocating motion in the horizontal direction, transversely to the axis of the cylindrical articles by a drive element (27) and wherein the reciprocating motion of the supporting plates (9) is synchronized with the reciprocating motion of the intermediate store (2), so that the supporting plates (9) and the intermediate store (2) are moving with the same frequency and size of travel.

2. Method as in claim 1 characterised in that during the transfer of the cylindrical articles (R) from the container (5) to the channels (7) of the intermediate store (2) the intermediate store (2) makes a reciprocating motion with a stroke principally equal to the size of the diameter of cylindrical articles.

3. Method as in claim 1 characterised in that during the transfer of the cylindrical articles from the container (5) to the channels (7) of the intermediate store (2) the intermediate store (2) makes a reciprocating motion with a stroke between 2 and 40 mm, preferably between 4 and 8 mm.

4. Method as in claim 1 characterised in that during the transfer of the cylindrical articles from the container (5) to the channels (7) of the intermediate store (2) the intermediate store (2) makes principally as many full cycles of the reciprocating motion as the number of layers of the cylindrical articles situated in the filled container.

5. Method as in claim 1 characterised in that during the transfer of the cylindrical articles (R) from the container (5) to the channels (7) of the intermediate store (2) the number of full cycles of the reciprocating motion made by the intermediate store (2) is greater than the number of layers of the cylindrical articles situated in the filled container.

6. Method as in claim 1 characterised in that during the transfer of the cylindrical articles from the container (5) to the channels (7) of the intermediate store (2) the number of full cycles of the reciprocating motion made by the intermediate store (2) is smaller than the number of layers of the cylindrical articles situated in the filled container.

7. Method as in claim 1 characterised in that during the transfer of the cylindrical articles from the container (5) to the channels (7) of the intermediate store (2) a frequency of the reciprocating motions is principally proportional to the speed of transfer of the cylindrical articles from the container (5) to the channels (7) of the intermediate store (2).

8. Method as in claim 1 characterised in that during the transfer of the cylindrical articles from the container (5) to the channels (7) of the intermediate store (2) a frequency of the reciprocating motions is constant.

9. Method as in claim 1 characterised in that during the transfer of the cylindrical articles from the container (5) to the channels (7) of the intermediate store (2) a frequency of the reciprocating motions is variable.

* * * * *